United States Patent
Hepguvendik et al.

(10) Patent No.: US 10,125,904 B2
(45) Date of Patent: Nov. 13, 2018

(54) SEALING GASKET AND METHOD FOR CREATING SAME

(71) Applicant: Evolution Engineering Inc., Calgary (CA)

(72) Inventors: Hasan Alper Hepguvendik, Calgary (CA); Aaron William Logan, Calgary (CA); Justin Christopher Logan, Calgary (CA); Gavin Gaw-Wae Lee, Calgary (CA); Luke Anthony Stack, Calgary (CA); Mojtaba Kazemi Miraki, Calgary (CA); Patrick Robert Derkacz, Calgary (CA); Daniel William Ahmoye, Calgary (CA)

(73) Assignee: Evolution Engineering Inc., Calgary, Alberta (CA)

( * ) Notice: Subject to any disclaimer, the term of this patent is extended or adjusted under 35 U.S.C. 154(b) by 3 days.

(21) Appl. No.: 15/190,895

(22) Filed: Jun. 23, 2016

(65) Prior Publication Data
US 2016/0377206 A1    Dec. 29, 2016

Related U.S. Application Data

(60) Provisional application No. 62/183,683, filed on Jun. 23, 2015.

(51) Int. Cl.
| | |
|---|---|
| *F16J 15/10* | (2006.01) |
| *F16L 17/025* | (2006.01) |
| *F16L 21/02* | (2006.01) |
| *F16J 15/06* | (2006.01) |
| *F16J 15/14* | (2006.01) |

(52) U.S. Cl.
CPC .......... *F16L 17/025* (2013.01); *F16J 15/061* (2013.01); *F16J 15/106* (2013.01); *F16J 15/14* (2013.01); *F16L 21/02* (2013.01)

(58) Field of Classification Search
CPC ........ F16L 17/025; F16L 21/02; F16J 15/061; F16J 15/106; F16J 15/14
See application file for complete search history.

(56) References Cited

U.S. PATENT DOCUMENTS 3,913,928 A * 10/1975 Yamaguchi ............... E03C 1/14
                                                                     277/604
3,998,478 A    12/1976 Zopfi
(Continued)

FOREIGN PATENT DOCUMENTS

WO     2014066972 A1    5/2014

OTHER PUBLICATIONS

CIPO, Office Action in Canadian Patent Application No. 2,933,720 dated Jun. 6, 2017.

*Primary Examiner* — Gilbert Y Lee
(74) *Attorney, Agent, or Firm* — NK Patent Law

(57) ABSTRACT

A sealing member or gasket for sealing a space between two adjacent surfaces, the sealing member having at least one non-helical circumferential extension or ridge configured for size-on-size or press fit engagement with a corresponding recess in at least one of the surfaces being sealed. The sealing member can be formed by molding followed by insertion between the two adjacent surfaces, or by positioning the surfaces adjacent one another and then injecting or pouring the sealing member material into the space and allowing it to solidify in place.

17 Claims, 2 Drawing Sheets

(56) References Cited

U.S. PATENT DOCUMENTS

| | | | |
|---|---|---|---|
| 4,078,810 A | 3/1978 | Arendt | |
| 5,288,087 A * | 2/1994 | Bertoldo | H02G 3/06 |
| | | | 277/616 |
| 5,615,895 A | 4/1997 | Guest | |
| 6,286,875 B1 | 9/2001 | Snodgrass et al. | |
| 6,572,152 B2 | 6/2003 | Dopf et al. | |
| 6,805,281 B1 | 10/2004 | Sirgedas | |
| 8,308,199 B2 | 11/2012 | Camwell et al. | |
| 9,528,636 B2 * | 12/2016 | Beele | F16L 5/10 |
| 9,611,966 B2 * | 4/2017 | Boelter | F16L 47/08 |
| 2007/0001402 A1 * | 1/2007 | Peet | F16J 15/061 |
| | | | 277/551 |
| 2009/0200793 A1 | 8/2009 | Smith, III | |
| 2012/0085583 A1 | 4/2012 | Logan et al. | |
| 2014/0091532 A1 * | 4/2014 | Unger | F16L 17/025 |
| | | | 277/616 |
| 2014/0131994 A1 | 5/2014 | Holmen et al. | |
| 2014/0174653 A1 * | 6/2014 | Babcanec | B32B 37/16 |
| | | | 156/293 |

* cited by examiner

SEALING GASKET AND METHOD FOR CREATING SAME

CROSS-REFERENCE TO RELATED APPLICATIONS

This application claims priority to U.S. Provisional Patent Application No. 62/183,683 filed on Jun. 23, 2015, the entire contents of which are incorporated by reference herein.

FIELD OF THE INVENTION

The present invention relates to sealing means and devices, and more specifically to the use of sealing gaskets.

BACKGROUND OF THE INVENTION

In numerous technical fields, mechanical sealing devices such as gaskets are commonplace to prevent or reduce the flow or introduction of fluids into undesired locations. For example, in the field of hydrocarbon exploration and production, conduits and their component parts are often provided with sealing means. Gaskets, O-rings and the like are commonly employed at interfaces between components to prevent leakage of the hydrocarbon and have become ubiquitous.

However, it is known that seals can become worn or shifted by the passage of fluids over time. In cases where the fluid is being transported under pressure, this risk is increased. In many cases the seal is in slip-fit engagement with the surfaces being sealed, and may thus be susceptible to shifting under pressure. Some prior art solutions incorporate a physical barrier to prevent the seal from shifting, but this introduces additional complexity and cost as well as another component that may itself become subject to wear under pressure.

What is needed, therefore, is a sealing mechanism, and method for producing same, that can be employed to reduce the risk of a seal dislodging under fluid impingement pressure.

SUMMARY OF THE INVENTION

The present invention therefore seeks to provide a seal that comprises one or more radial extensions that engage with corresponding recesses or grooves in the surface or surfaces being sealed.

According to a first broad aspect of the present invention, there is provided a sealing member for sealing a space between first and second adjacent surfaces, the sealing member comprising:
  an inwardly-facing surface and an outwardly-facing surface, the inwardly-facing surface for engaging the first adjacent surface and the outwardly-facing surface for engaging the second adjacent surface;
  one non-helical circumferential extension for extending from the sealing member toward one of the adjacent surfaces; and
  the one extension configured for engagement with a corresponding recess in the one adjacent surface.

In some exemplary embodiments of the first aspect, the first and second adjacent surfaces are surfaces of inner and outer mated cylindrical members respectively, the inner cylindrical member is for positioning against the inwardly-facing surface of the sealing member, the outer cylindrical member is for positioning against the outwardly-facing surface of the sealing member, and the sealing member is configured to fill the space between the cylindrical members along at least a portion of their lengths.

Preferably, the extension is continuous around a circumference of the sealing member and the recess is continuous around a circumference of the one adjacent surface. The engagement of the extension and the corresponding recess may be size-on-size or press fit.

Exemplary sealing members preferably comprise a plurality of non-helical circumferential extensions for extending from the sealing member toward at least one of the adjacent surfaces, and each of the plurality of extensions is configured for engagement with a corresponding recess in the at least one of the adjacent surfaces.

In some exemplary embodiments, the one extension is for extending from the sealing member toward the first adjacent surface, the recess being in the first adjacent surface, and the sealing member further comprises a second non-helical circumferential extension for extending from the sealing member toward the second adjacent surface, with the second extension configured for engagement with a corresponding second recess in the second adjacent surface.

Where desirable, certain exemplary embodiments have the sealing member composed of an electrically non-conductive material, which would most preferably comprise polyether ether ketone (PEEK).

In some exemplary embodiments, the extension or extensions have an angled profile. In such a case the one extension may be angled toward one axial direction. Where the first and second adjacent surfaces are surfaces of inner and outer mated cylindrical members respectively, and the cylindrical members are configured for passage of a fluid therethrough, the one axial direction is a direction from which the fluid is anticipated to impinge against the sealing member.

According to a second broad aspect of the present invention, there is provided a sealing arrangement comprising:
  a first member;
  a second member adjacent but spaced from the first member; and
  a sealing member sealing the space between the first and second members, the sealing member comprising:
    an inwardly-facing surface and an outwardly-facing surface, the inwardly-facing surface engaging the first member and the outwardly-facing surface engaging the second member;
    one non-helical circumferential extension extending from the sealing member toward one of the first and second members; and
    the one extension in engagement with a corresponding recess in the one of the first and second members.

In some exemplary embodiments of the second aspect, the first and second members are inner and outer mated cylindrical members respectively, the inner cylindrical member is positioned against the inwardly-facing surface of the sealing member, the outer cylindrical member is positioned against the outwardly-facing surface of the sealing member, and the sealing member fills the space between the cylindrical members along at least a portion of their lengths.

In some preferred embodiments the extension is continuous around a circumference of the sealing member and the recess is continuous around a circumference of the one of the first and second members. The engagement of the extension and the corresponding recess may be size-on-size or press fit.

Some exemplary embodiments comprise a plurality of non-helical circumferential extensions extending from the sealing member toward at least one of the first and second members, with each of the plurality of extensions in engagement with a corresponding recess in the at least one of the first and second members.

In some exemplary embodiments the one extension extends from the sealing member toward the first member, the recess being in the first member, and the sealing arrangement further comprises a second non-helical circumferential extension extending from the sealing member toward the second member, with the second extension in engagement with a corresponding second recess in the second member.

Where desirable, certain exemplary embodiments have the sealing member composed of an electrically non-conductive material, which would most preferably comprise PEEK.

In some exemplary embodiments, the extension or extensions have an angled profile. In such a case the one extension may be angled toward one axial direction. Where the first and second members are inner and outer mated cylindrical members respectively, and the cylindrical members are configured for passage of a fluid therethrough, the one axial direction is a direction from which the fluid is anticipated to impinge against the sealing member.

According to a third broad aspect of the present invention, there is provided a gap sub for insertion in a drill string comprising:
 a cylindrical male member;
 a cylindrical female member, the male and female members mated together but separated by an annular space; and
 a cylindrical sealing member disposed in the annular space between the male member and the female member;
 wherein the sealing member comprises:
  an inwardly-facing surface and an outwardly-facing surface, the inwardly-facing surface engaging the male member and the outwardly-facing surface engaging the female member;
  one non-helical circumferential extension extending from the sealing member toward one of the male and female members; and
  the one extension is in engagement with a corresponding recess in the one of the male and female members.

In some exemplary embodiments of the third aspect, the extension is continuous around a circumference of the sealing member and the recess is continuous around a circumference of the one of the male and female members. The engagement of the extension and the corresponding recess may be size-on-size or press fit.

Exemplary embodiments of the gap sub preferably comprise a plurality of non-helical circumferential extensions extending from the sealing member toward at least one of the male and female members, and each of the plurality of extensions is in engagement with a corresponding recess in the at least one of the male and female members.

In some exemplary embodiments, the one extension extends from the sealing member toward the male member, the recess being in the male member, and the gap sub further comprises a second non-helical circumferential extension extending from the sealing member toward the female member, the second extension in engagement with a corresponding second recess in the female member.

As it may be desirable in the context of a gap sub to incorporate electrically non-conductive materials, certain exemplary embodiments have the sealing member composed of an electrically non-conductive material, which would most preferably comprise PEEK.

Where advantageous, exemplary embodiments have the one extension angled toward one axial direction. Where the male and female members are configured for passage of a fluid therethrough, the one axial direction is a direction from which the fluid is anticipated to impinge against the sealing member.

According to a fourth broad aspect of the present invention, there is provided a sealing member for sealing an annular space between first and second cylindrical members, the first cylindrical member for positioning at least partially within the second cylindrical member, the sealing member cylindrical, the sealing member comprising:
 an inwardly-facing surface and an outwardly-facing surface, the inwardly-facing surface for engaging the first cylindrical member and the outwardly-facing surface for engaging the second cylindrical member;
 a plurality of inwardly-directed non-helical circumferential extensions for extending from the sealing member toward the first cylindrical member; and
 a plurality of outwardly-directed non-helical circumferential extensions for extending from the sealing member toward the second cylindrical member;
 the inwardly-directed extensions configured for engagement with corresponding recesses in the first cylindrical member, the inwardly-directed extensions continuous around the inwardly-facing surface of the sealing member and the recesses continuous around an outer circumference of the first cylindrical member; and
 the outwardly-directed extensions configured for engagement with corresponding recesses in the second cylindrical member, the outwardly-directed extensions continuous around the outwardly-facing surface of the sealing member and the recesses continuous around an inner circumference of the second cylindrical member.

In some exemplary embodiments of the fourth aspect, the extensions are angled toward one axial direction. Where the first and second cylindrical members are configured for passage of a fluid therethrough, the one axial direction is a direction from which the fluid is anticipated to impinge against the sealing member. The engagement of each extension and its corresponding recess may be size-on-size or press fit.

According to a fifth broad aspect of the present invention, there is provided a method for sealing an annular space between first and second members, the first member disposed at least partially within the second member such that an outer surface of the first member faces an inner surface of the second member, comprising the steps of:
 a. providing at least one recess in at least one of the inner surface and the outer surface;
 b. preparing a flowable sealant material;
 c. injecting the flowable sealant material into the annular space;
 d. allowing the flowable sealant material to enter the at least one recess; and
 e. allowing the flowable sealant material to harden in the annular space to form a seal having engagement with the inner surface, the outer surface and the at least one recess.

In some exemplary embodiments of the fifth aspect, the first and second members are cylindrical conduits.

Step a. may comprise machining the at least one recess in at least one of the inner surface and the outer surface. Step a. preferably further comprises providing the recess around the entire circumference of the at least one of the inner surface and the outer surface, forming a continuous recess.

The at least one recess is preferably a plurality of recesses, and step a. may comprise providing at least one recess in each of the inner surface and the outer surface. The engagement with the inner surface, the outer surface and the at least one recess may be size-on-size or press fit.

In some exemplary methods, the flowable sealant material is an electrically non-conductive material.

In some exemplary methods, step a. comprises providing an angled recess that is angled toward an axial direction. Where the first and second members are configured for passage of a fluid therethrough, the axial direction is a direction from which the fluid is anticipated to impinge against the seal.

Step c. preferably comprises injecting the flowable sealant material under pressure.

Step b. preferably comprises heating the flowable sealant material and step e. then comprises allowing the flowable sealant material to cool.

According to a sixth broad aspect of the present invention, there is provided a method for sealing an annular space between first and second members, the first member to be disposed at least partially within the second member such that an outer surface of the first member faces an inner surface of the second member, comprising the steps of:
 a. molding an annular seal, the seal having an inwardly-facing surface and an outwardly-facing surface, the inwardly-facing surface configured for engagement with the outer surface of the first member, the outwardly-facing surface configured for engagement with the inner surface of the second member, the annular seal having at least one non-helical continuous extension extending around a circumference of at least one of the inwardly-facing surface and the outwardly-facing surface;
 b. providing at least one recess in the inner surface and/or the outer surface corresponding to the position of the at least one extension; and
 c. connecting the annular seal and the first and second members such that the at least one extension engages the at least one recess.

In some exemplary embodiments of the sixth aspect, the first and second members are cylindrical conduits. Step b. may comprise machining the at least one recess in the inner surface and/or the outer surface corresponding to the position of the at least one extension.

The at least one recess is preferably a plurality of recesses. In some exemplary embodiments, step a. comprises the annular seal having at least one extension extending around a circumference of both the inwardly-facing surface and the outwardly-facing surface, and step b. comprises providing at least one recess in each of the inner surface and the outer surface.

In some exemplary embodiments the annular seal comprises an electrically non-conductive material, preferably PEEK.

In some exemplary embodiments, step a. comprises the at least one extension being angled toward one axial direction, and step b. comprises the at least one recess being angled toward the one axial direction. Where the first and second members are configured for passage of a fluid therethrough, the one axial direction is a direction from which the fluid is anticipated to impinge against the annular seal.

The annular seal is preferably flexible after molding to allow insertion of the at least one extension into the at least one recess.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the invention to the precise forms of any exemplary embodiment. Accordingly, the description and drawings are to be regarded in an illustrative, rather than a restrictive, sense.

The present invention is directed to a sealing member and applications thereof. The exemplary embodiment is a sealing member for use with a gap sub, although those skilled in the art will be able to readily determine other applications of the present invention.

The sealing member is provided with at least one non-helical circumferential or ring-shaped extension. The extension is non-helical as the intention is to prevent or reduce the risk of fluid getting past the seal, while a helical extension might potentially allow fluid to flow along the helical course and past the seal. To that same end, the extension extends around the entire circumference of the inner or outer surface of the seal, thus providing a barrier that extends around and across the entire potential leakage area.

Figure 1:
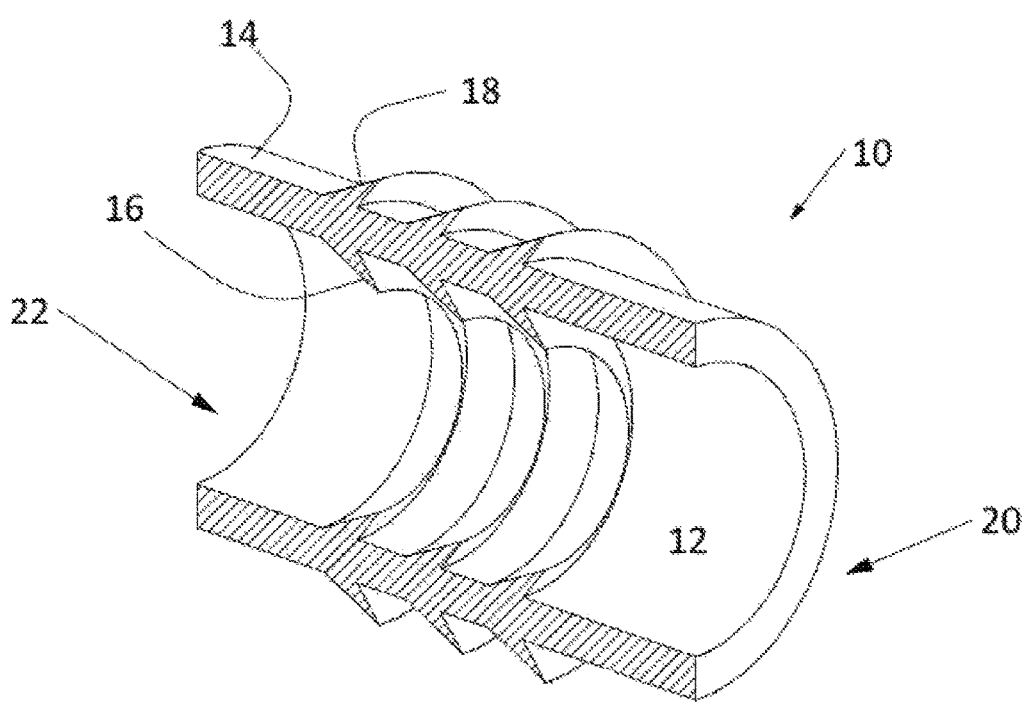
FIG. 1 is a cut-away perspective view of a gasket according to an embodiment of the present invention.

Turning to FIG. 1, an exemplary seal 10 in accordance with the present invention is illustrated. The seal 10 is shown in isolation for purposes of illustration, but it will be clear from the within teaching that the seal 10 could be formed in place between two surfaces to be sealed.

The exemplary seal 10 is generally cylindrical in shape and comprises an inwardly-facing surface 12 and an outwardly-facing surface 14. FIG. 1 is a cut-away view to show the interior of the seal 10, and it is to be understood that FIG. 1 only illustrates one half of the seal 10, the whole seal 10 having a cylindrical form. The seal 10 extends from a high pressure end 20 to a low pressure end 22, which refers to the flow of fluid within the conduits that seal 10 is intended to seal in this exemplary embodiment. The high pressure end 20 would normally be upstream and the low pressure end 22 would normally be downstream. The inwardly-facing surface 12 is provided with a plurality of inner extensions 16, while the outwardly-facing surface 14 is provided with a plurality of outer extensions 18. While three inner extensions 16 and three outer extensions 18 are shown, it will be clear to those skilled in the art that any desirable numbers of extensions 16, 18 can be employed depending on the context.

While the seal 10 can be made of any suitable material depending on the context, in the context of a gap sub the use of electrically non-conductive materials is advantageous. Many electrically non-conductive materials are known to be of use on gap subs, but the seal 10 is preferably composed of polyether ether ketone (PEEK). Alternatively, a thermoplastic urethane like Texin™ or another electrically non-conductive material could be used, and one skilled in the art would be able to determine a suitable material.

The present invention is directed to a seal that incorporates at least one circumferential extension, where the circumferential extension is sized and configured to mate in size-on-size or press fit manner with a corresponding recess or groove in the surface against which the seal engages. In the exemplary embodiment, FIGS. 2 and 3 illustrate embodiments of this interface and paired extensions and recesses.

Figure 2:
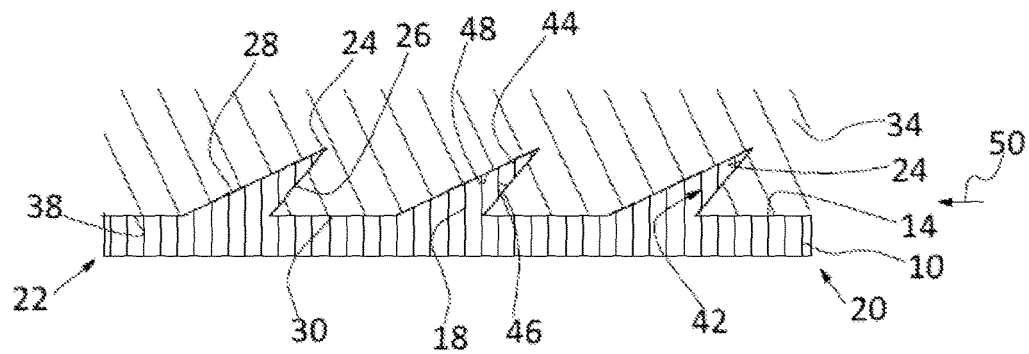
FIG. 2 is a sectional view of an interface between a gasket and an adjacent surface according to an exemplary embodiment of the present invention.
Figure 3:
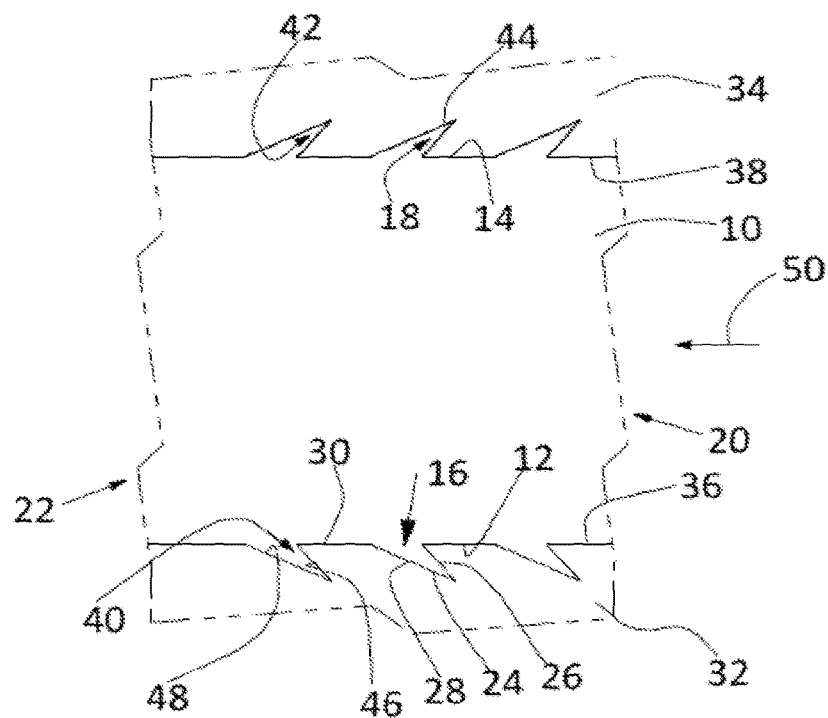
FIG. 3 is a sectional view of an interface between a gasket and two adjacent surfaces according to an exemplary embodiment of the present invention.

FIG. 2 is a sectional view showing a sealing interface between the seal 10 and an outer or female cylinder 34. In the context of a gap sub, axially adjacent tubular members are known, the adjacent members having corresponding male and female ends for connection means. In the within description, the two tubular members will thus be referred to as the male cylinder 32 and the female cylinder 34, the male cylinder 32 configured for at least partial insertion within the interior of the female cylinder 34.

The seal 10 is provided with three outer extensions 18. Each of the outer extensions 18 comprises a high pressure side 26, a low pressure side 28, and a tip 24, the high pressure side 26 being upstream and the low pressure side 28 being downstream. As can be seen in FIG. 2, the geometry of the extension 18 is such that the low pressure side 28 is longer than the high pressure side 26, resulting in a barbed profile that angles toward the high pressure end 20 of the seal 10. Adjacent extensions 18 are separated by a gap 30, which can be any distance determined to be suitable by a skilled person.

Likewise, the female cylinder 34 is provided with three corresponding outer recesses or grooves 42. Each of the outer recesses 42 comprises a high pressure side 46, a low pressure side 48 and an inner extent 44, the high pressure side 46 being upstream and the low pressure side 48 being downstream. Like the corresponding extensions 18, the low pressure side 48 of each recess 42 is longer than the high pressure side 46, resulting in a barbed profile that angles toward the high pressure end 20 of the seal 10.

When the seal 10 is in sealing engagement with the female cylinder 34, the extensions 18 are each fully engaged in size-on-size or press fit manner with their corresponding recesses 42. When sealed, an inner surface 38 of the female cylinder 34 is engaged with the outwardly-facing surface 14 of the seal 10, the high pressure side 26 of each extension 18 is engaged with the high pressure side 46 of the corresponding recess 42, the low pressure side 28 of each extension 18 is engaged with the low pressure side 48 of the corresponding recess 42, and the tip 24 of each extension 18 is engaged with the inner extent 44 of the corresponding recess 42. Thus, no gap remains between the seal 10 and the female cylinder 34.

In FIG. 2, fluid is shown as impinging in direction 50. In a gap sub, fluid would be passing through the sub under pressure and would attempt to move into and through the lower-pressure space between the male and female cylinders 32, 34. Where a seal is in place, the fluid would attempt to displace the seal and move under or around it. In the exemplary embodiment shown in FIG. 2, however, it can be seen that fluid attempting to press against the high pressure end 20 of the seal 10 in the direction 50 could potentially travel between the outwardly-facing surface 14 of the seal 10 and the inner surface 38 of the female cylinder 34 until meeting the high pressure side 26 of the first extension 18 encountered. The fluid would exert force against the high pressure side 26 of the extension 18 causing the extension 18 to press against the corresponding recess 42, and specifically would cause the low pressure side 28 of the extension 18 to press against the low pressure side 48 of the recess 42. In this way, the fluid pressure would serve to strengthen the engagement between the seal 10 and the female cylinder 34 and make it less likely that the fluid could displace the seal 10 or cause the sealing engagement to fail. This is particularly the case where, as illustrated, the extensions 18 and corresponding recesses 42 are angled toward the direction from which the fluid is impinging.

Turning now to FIG. 3, an exemplary embodiment of the present invention is illustrated wherein the seal 10 is in an annular space between the male cylinder 32 and the female cylinder 34. The seal 10 is provided with three outer extensions 18 and three inner extensions 16. Each of the inner and outer extensions 16, 18 comprises a high pressure side 26, a low pressure side 28, and a tip 24. The geometry of each extension 16, 18 is such that the low pressure side 28 is longer than the high pressure side 26, resulting in a barbed profile that angles toward the high pressure end 20 of the seal 10. Adjacent extensions 16, 18 are separated by a gap 30, which can be any distance determined to be suitable by a skilled person.

The female cylinder 34 is provided with three outer recesses 42 corresponding to the outer extensions 18, while the male cylinder 32 is provided with three inner recesses 40 corresponding to the inner extensions 16. Each of the inner and outer recesses 40, 42 comprises a high pressure side 46, a low pressure side 48 and an inner extent 44. Like the corresponding extensions 18, the low pressure side 48 of each recess 40, 42 is longer than the high pressure side 46, resulting in a barbed profile that angles toward the high pressure end 20 of the seal 10.

When the seal 10 is in sealing engagement with the male and female cylinders 32, 34, the extensions 16, 18 are each fully engaged in size-on-size or press fit manner with their corresponding recesses 40, 42. When sealed, the inner surface 38 of the female cylinder 34 is engaged with the outwardly-facing surface 14 of the seal 10, an outer surface 36 of the male cylinder 32 is engaged with the inwardly-facing surface 12 of the seal 10, the high pressure side 26 of each extension 16, 18 is engaged with the high pressure side 46 of the corresponding recess 40, 42, the low pressure side 28 of each extension 16, 18 is engaged with the low pressure side 48 of the corresponding recess 40, 42, and the tip 24 of each extension 16, 18 is engaged with the inner extent 44 of the corresponding recess 40, 42. Thus, no gap remains between the seal 10 and the male and female cylinders 32, 34.

In FIG. 3, fluid is shown as impinging in direction 50. In the exemplary embodiment, it can be seen that fluid attempting to press against the high pressure end 20 of the seal 10 in the direction 50 could potentially travel between the outwardly-facing surface 14 of the seal 10 and the inner surface 38 of the female cylinder 34 until meeting the high pressure side 26 of the first outer extension 18 encountered, and/or between the inwardly-facing surface 12 of the seal 10 and the outer surface 36 of the male cylinder 32 until meeting the high pressure side 26 of the first inner extension 16 encountered. The fluid would exert force against the high pressure sides 26 of the extensions 16, 18 causing the extensions 16, 18 to press against the corresponding recesses 40, 42, and specifically would cause the low pressure sides 28 of the extensions 16, 18 to press against the low pressure sides 48 of the recesses 40, 42. Thus, the fluid pressure would serve to strengthen the engagement between the seal 10 and the male and female cylinders 32, 34, particularly where, as illustrated, the extensions 16, 18 and corresponding recesses 40, 42 are angled toward the direction from which the fluid is impinging.

As will be clear from the above, those skilled in the art would be readily able to determine obvious physical variants capable of providing the seal 10 functionality, and all such variants and functional equivalents are intended to fall within the scope of the present invention.

The present invention also extends to methods for producing sealing engagements. In one exemplary embodiment of a method according to the present invention, with reference to the elements described above, an annular space between the male and female cylinders 32, 34 is sealed by a method using the cylinders 32, 34 themselves as a mold for the seal 10. The first exemplary method begins with recesses 40, 42 being formed in the surfaces 36, 38 of the cylinders 32, 34. The forming of the recesses 40, 42 can be achieved by many known methods, but preferably would be achieved by machining of the recesses 40, 42 into the surfaces 36, 38.

A suitable sealant material is then prepared, which may be Texin™ or any other context-appropriate material. The sealant material is made flowable so that it can be injected or poured into the space between the cylinders 32, 34. The sealant material is preferably heated to reduce its viscosity and render it sufficiently flowable, and then the heated material is injected under pressure or poured into the space between the cylinders 32, 34. The heated sealant material is allowed to enter the recesses 40, 42, filling the recesses 40, 42 and the space between the cylinders 32, 34. With the space filled, the sealant material is then allowed to cool and harden in place. The result is a seal 10 having a size-on-size engagement with the cylinders 32, 34 and the recesses 40, 42.

In another exemplary embodiment of a method according to the present invention, the seal 10 is formed as a separate molded component and subsequently assembled with the male and female cylinders 32, 34. In this second embodiment, the seal 10 is formed by molding to have extensions 16, 18 extending outwardly from the inwardly-facing and outwardly-facing surfaces 12, 14, respectively. The seal 10 would be molded such that the inwardly-facing and outwardly-facing surfaces 12, 14 would mate with the outer surface 36 of the male cylinder 32 and the inner surface 38 of the female cylinder 34, respectively. Recesses 40, 42 would be formed in the surfaces 36, 38 of the male and female cylinders 32, 34, corresponding in dimensions and profile with the extensions 16, 18; alternatively, the recesses 40, 42 could be formed first, and the mold for the seal 10 configured to produce extensions 16, 18 of corresponding dimensions and profile. Again, the recesses 40, 42 are preferably formed by conventional machining techniques. Once the seal 10 has been molded and the recesses 40, 42 formed, the seal 10 can be connected with the male and female cylinders 32, 34 such that the extensions 16, 18 engage the corresponding recesses 40, 42. As the seal 10 is pre-formed and subsequently connected to the cylinders 32, 34, it is preferable to make the seal 10 from a material that has adequate flexibility after hardening to enable the connection step.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A sealing member for sealing a space between first and second adjacent surfaces, the sealing member comprising:
an inwardly-facing surface and an outwardly-facing surface, the inwardly-facing surface for engaging the first adjacent surface and the outwardly-facing surface for engaging the second adjacent surface;
a non-helical circumferential extension for extending from the sealing member toward one of the adjacent surfaces; and
the extension configured for engagement with a corresponding recess in the one adjacent surface;
wherein the extension is continuous around a circumference of the sealing member and the recess is continuous around a circumference of the one adjacent surface;
wherein the extension comprises a first extension surface generally facing a first axial direction and a second extension surface generally facing a second axial direction opposite to the first axial direction, the first extension surface shorter than the second extension surface such that the extension is angled generally toward the first axial direction; and
wherein the corresponding recess comprises a first recess surface generally facing the second axial direction and a second recess surface generally facing the first axial direction, the first recess surface shorter than the second recess surface such that the recess is angled generally toward the first axial direction, the first extension surface configured for facial mating with the first recess surface and the second extension surface configured for facial mating with the second recess surface.

2. The sealing member of claim 1 comprising:
a plurality of non-helical circumferential extensions for extending from the sealing member toward at least one of the adjacent surfaces; and
each of the plurality of extensions configured for engagement with a corresponding recess in the at least one of the adjacent surfaces.

3. The sealing member of claim 1 wherein:
the extension is for extending from the sealing member toward the first adjacent surface, the recess being in the first adjacent surface;
the sealing member further comprising:
a second non-helical circumferential extension for extending from the sealing member toward the second adjacent surface; and
the second extension configured for engagement with a corresponding second recess in the second adjacent surface.

4. The sealing member of claim 1 wherein the sealing member is composed of an electrically non-conductive material.

5. A gap sub for insertion in a drill string comprising:
a cylindrical male member;
a cylindrical female member, the male and female members mated together but separated by an annular space; and
a cylindrical sealing member disposed in the annular space between the male member and the female member;
wherein the sealing member comprises:
an inwardly-facing surface and an outwardly-facing surface, the inwardly-facing surface engaging the male member and the outwardly-facing surface engaging the female member;
a non-helical circumferential extension extending from the sealing member toward one of the male and female members; and
the extension is in engagement with a corresponding recess in the one of the male and female members;
wherein the extension is continuous around a circumference of the sealing member and the recess is continuous around a circumference of the one of the male and female members;
wherein the extension comprises a first extension surface generally facing a first axial direction and a second extension surface generally facing a second axial direction opposite to the first axial direction, the first extension surface shorter than the second extension surface such that the extension is angled generally toward the first axial direction; and
wherein the corresponding recess comprises a first recess surface generally facing the second axial direction and a second recess surface generally facing the first axial direction, the first recess surface shorter than the second recess surface such that the recess is angled generally toward the first axial direction, the first extension surface configured for facial mating with the first recess surface and the second extension surface configured for facial mating with the second recess surface.

6. The gap sub of claim 5 comprising:
a plurality of non-helical circumferential extensions extending from the sealing member toward at least one of the male and female members; and
each of the plurality of extensions is in engagement with a corresponding recess in the at least one of the male and female members.

7. The gap sub of claim 5 wherein:
the extension extends from the sealing member toward the male member, the recess being in the male member;
the gap sub further comprising:
a second non-helical circumferential extension extending from the sealing member toward the female member; and
the second extension is in engagement with a corresponding second recess in the female member.

8. The gap sub of claim 5 wherein the sealing member is composed of an electrically non-conductive material.

9. A method for sealing an annular space between first and second members, the first member disposed at least partially within the second member such that an outer surface of the first member faces an inner surface of the second member, comprising the steps of:
a. providing at least one circumferential recess in at least one of the inner surface and the outer surface, the at least one circumferential recess comprising a first recess surface generally facing a second axial direction and a second recess surface generally facing a first axial direction opposite to the second axial direction, the first recess surface shorter than the second recess surface such that the at least one circumferential recess is angled generally toward the first axial direction;
b. preparing a flowable sealant material;
c. injecting the flowable sealant material into the annular space;
d. allowing the flowable sealant material to enter the at least one circumferential recess; and
e. allowing the flowable sealant material to harden in the annular space to form a seal having engagement with the inner surface, the outer surface and the at least one circumferential recess, such that the seal comprises at least one circumferential extension within the at least one circumferential recess, the at least one circumferential extension comprising a first extension surface generally facing the first axial direction and a second extension surface generally facing the second axial direction, the first extension surface shorter than the second extension surface such that the at least one circumferential extension is angled generally toward the first direction.

10. The method of claim 9 wherein the first and second members are cylindrical conduits.

11. The method of claim 9 wherein step a. comprises machining the at least one circumferential recess in at least one of the inner surface and the outer surface.

12. The method of claim 9 wherein step a. comprises providing the at least one circumferential recess around the entire circumference of the at least one of the inner surface and the outer surface, forming a continuous recess.

13. The method of claim 9 wherein the at least one circumferential recess is a plurality of circumferential recesses.

14. The method of claim 9 wherein step a. comprises providing at least one circumferential recess in each of the inner surface and the outer surface.

15. The method of claim 9 wherein the first and second members are configured for passage of a fluid therethrough, and the first axial direction is a direction from which the fluid is anticipated to impinge against the seal.

16. The method of claim 9 wherein step c. comprises injecting the flowable sealant material under pressure.

17. The method of claim 9 wherein step b. comprises heating the flowable sealant material and step e. comprises allowing the flowable sealant material to cool.

* * * * *